United States Patent
Berge et al.

(10) Patent No.: US 11,205,016 B2
(45) Date of Patent: *Dec. 21, 2021

(54) SECURE CRYPTO MODULE INCLUDING OPTICAL SECURITY PATHWAY

(71) Applicant: International Business Machines Corporation, Armonk, NY (US)

(72) Inventors: Layne A. Berge, Rochester, MN (US); John R. Dangler, Rochester, MN (US); Matthew S. Doyle, Chatfield, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 16/426,705

(22) Filed: May 30, 2019

(65) Prior Publication Data

US 2019/0278946 A1    Sep. 12, 2019

Related U.S. Application Data

(63) Continuation of application No. 15/079,802, filed on Mar. 24, 2016, now Pat. No. 10,430,615.

(51) Int. Cl.
*G06F 21/00* (2013.01)
*G06F 21/72* (2013.01)
(Continued)

(52) U.S. Cl.
CPC .............. *G06F 21/72* (2013.01); *G06F 21/75* (2013.01); *G06F 21/86* (2013.01); *H04B 10/85* (2013.01)

(58) Field of Classification Search
CPC .......... G06F 21/72; G06F 21/75; G06F 21/86; G06F 21/87; G06F 21/00; G06F 13/409;
(Continued)

(56) References Cited

U.S. PATENT DOCUMENTS

| 4,278,837 A | 7/1981 | Best |
| 5,117,457 A | 5/1992 | Comerford et al. |

(Continued)

OTHER PUBLICATIONS

Grand, Joe, "Introduction to Embedded Security," Presentation, Black Hat USA 2004 Briefings, Grand Idea Studio, Inc., Jul. 28, 2004 ,http://blackhat.com/presentations/bh-usa-04/bh-us-04-grand/grand_embedded_security_US04.pdf.
(Continued)

*Primary Examiner* — Josnel Jeudy
(74) *Attorney, Agent, or Firm* — ZIP Group PLLC

(57) ABSTRACT

An optical electromagnetic radiation (EM) emitter and receiver are located upon a printed circuit board (PCB) layer and are optically connected to an optical security pathway that is between a pair of signal traces. A predetermined reference flux is determined, the reference flux being the expected EM transmitted by the optical security pathway and received by the receiver. When the PCB is subject to an unauthorized access thereof (e.g., drilled, sawed, cut, etc.), the optical EM transferred by optical security pathway is altered. An optical monitoring device that monitors the flux of the optical EM received by the receiver detects a change in flux, in relation to the reference flux, and passes a tamper signal to one or more computer system devices to respond to the unauthorized access. For example, one or more cryptographic adapter card or computer system functions or secured crypto components may be disabled.

16 Claims, 9 Drawing Sheets

(51) Int. Cl.
*G06F 21/75* (2013.01)
*G06F 21/86* (2013.01)
*H04B 10/85* (2013.01)

(58) Field of Classification Search
CPC ..... G06F 13/4282; G06F 13/42; H04B 10/85; H04L 9/32; H04L 9/3234; H04L 9/3263
USPC ........................................................ 713/192
See application file for complete search history.

(56) References Cited

U.S. PATENT DOCUMENTS

| | | | |
|---|---|---|---|
| 6,076,948 A | 6/2000 | Bukosky et al. | |
| 6,474,860 B2* | 11/2002 | Wojnarowski | G02B 6/4225 250/221 |
| 7,436,316 B2 | 10/2008 | Fleischman et al. | |
| 7,611,292 B2* | 11/2009 | Graham | G02B 6/3817 385/75 |
| 7,703,201 B2 | 4/2010 | Oggioni et al. | |
| 9,063,307 B2 | 6/2015 | Yabre et al. | |
| 9,113,844 B2 | 8/2015 | Hollstien | |
| 9,705,283 B1 | 7/2017 | Deppe et al. | |
| 2002/0097962 A1 | 7/2002 | Yoshimura et al. | |
| 2003/0026303 A1 | 7/2003 | Ouchi | |
| 2004/0156640 A1 | 8/2004 | Dress et al. | |
| 2005/0275538 A1 | 12/2005 | Kulpa | |
| 2010/0067853 A1* | 3/2010 | Kuznia | G02B 6/43 385/88 |
| 2013/0120700 A1 | 5/2013 | Kitson | |
| 2015/0039797 A1 | 2/2015 | Tsai | |
| 2019/0097722 A1 | 3/2019 | McLaurin et al. | |

OTHER PUBLICATIONS

List of IBM Patents or Patent Applications Treated as Related, filed herewith, Jun. 2, 2021.

* cited by examiner

SECURE CRYPTO MODULE INCLUDING OPTICAL SECURITY PATHWAY

FIELD OF THE INVENTION

Embodiments of the invention generally relate to computer systems and more particularly to computer systems that have a secure crypto module including an optical security pathway that transfers optically visible electromagnetic radiation (EM).

DESCRIPTION OF THE RELATED ART

A cryptographic module is a set of hardware, software, firmware, or some combination thereof that implements cryptographic logic or cryptographic processes, including cryptographic algorithms, and is contained within the cryptographic boundary of the module. U.S. Government Federal Information Processing Standard (FIPS) 140-2 Security Requirements for Cryptographic Modules-(Level 4) is a standard that specifies security requirements for cryptographic modules. This standard requires that physical security mechanisms provide a complete envelope of protection around the cryptographic module with the intent of detecting and responding to all unauthorized attempts at physical access.

A non-exhaustive list of a cryptographic modules is as follows: cryptographic coprocessor, cryptographic accelerator, cryptographic adapter card, cryptographic field programmable gate array (FPGA), memory storing cryptographic accelerator data, etc.

In an example of a cryptographic module, a cryptographic coprocessor is a secure cryptoprocessor that performs cryptographic operations used by application programs and by data handling operations, such as SSL (Secure Sockets Layer) private key transactions associated with SSL digital certificates. The cryptoprocessor includes a tamper-responding hardware security module that provides secure storage for storing crypto keys and other sensitive data. Cryptoprocessor applications may include financial PIN (Personal Identification Number) transactions, bank-to-clearing-house transactions, EMV (Europay®, MasterCard®, and Visa®) transactions for integrated circuit (chip) based credit cards, basic SET (Secure Electronic Transaction) block processing, and general-purpose cryptographic applications using symmetric key, hashing, and public key algorithms. The crypto keys may be generated in the cryptoprocessor and may be saved in a keystore file encrypted under a master key of that cryptoprocessor.

In another particular example of a cryptographic module, a cryptographic adapter card includes a printed circuit board that may be plugged into a computer system motherboard. The cryptographic adapter card includes a secure crypto module that contains and generally forms a boundary to one or more other cryptographic modules contained therein forming the envelope of protection around the one or more other cryptographic module(s). Secure crypto modules typically include tamper sensors that detect and respond to unauthorized attempts at physical access.

SUMMARY

In an embodiment of the present invention, a cryptographic adapter card is presented. The card includes a printed circuit board (PCB) that includes a connector that interconnects with a motherboard. The card further includes a secure crypto module that includes a daughter card electrically connected to the PCB. The daughter card includes a wiring dielectric layer, a pair of neighboring signal traces upon the wiring dielectric layer, an optical security pathway upon the wiring dielectric layer between the pair of neighboring signal traces, an optical electromagnetic radiation (EM) emitter upon the wiring dielectric layer optically connected to a first end of the optical security pathway, an optical EM receiver upon the wiring dielectric layer optically connected to a second end of the optical security pathway, and a crypto component. A destruct feature of the crypto component is programmed in response to the optical EM receiver detecting a predetermined threshold decrease in optical flux of optical EM that is emitted from the optical EM emitter, that is transmitted by the optical security pathway, and that is received at the optical EM receiver.

In another embodiment of the present invention, a data handling electronic device is presented. The device includes a motherboard that includes a processor and a memory. The device further includes a cryptographic adapter card connected to the motherboard. The cryptographic adapter card includes a printed circuit board (PCB) that includes a connector that interconnects with the motherboard. The cryptographic adapter card further includes a secure crypto module that includes a daughter card electrically connected to the PCB. The daughter card includes a wiring dielectric layer, a pair of neighboring signal traces upon the wiring dielectric layer, an optical security pathway upon the wiring dielectric layer between the pair of neighboring signal traces, an optical electromagnetic radiation (EM) emitter upon the wiring dielectric layer optically connected to a first end of the optical security pathway, an optical EM receiver upon the wiring dielectric layer optically connected to a second end of the optical security pathway, and a crypto component. A destruct feature of the crypto component is programmed in response to the optical EM receiver detecting a predetermined threshold decrease in optical flux of optical EM that is emitted from the optical EM emitter, that is transmitted by the optical security pathway, and that is received at the optical EM receiver.

In yet another embodiment of the present invention, a method of fabricating a printed circuit board (PCB) is presented. The method includes forming a first signal trace upon the wiring dielectric layer and forming a second signal trace upon the wiring dielectric layer, forming an optical security pathway upon the wiring dielectric layer between the first signal trace and the second signal trace, optically attaching an optical electromagnetic radiation (EM) emitter to the optical security pathway, and optically attaching an optical EM receiver to the optical security pathway.

These and other embodiments, features, aspects, and advantages will become better understood with reference to the following description, appended claims, and accompanying drawings.

DETAILED DESCRIPTION

An optical security pathway is located upon or within a printed circuit board (PCB). The PCB is utilized by a cryptographic adapter card that includes one or more secured crypto components that carry out cryptographic data handling functions. The optical security pathway may be located upon a PCB of the crypto adapter card and/or upon a daughter PCB within a secure crypto module upon the crypto adapter card. The crypto adapter card may be installed within a computer system that performs cryptographic functions utilizing one or more secured crypto components. The optical security pathway may generally identify an unauthorized physical access attempt.

An optical electromagnetic radiation (EM) emitter and receiver are optically connected to the optical security pathway. In normal operation, a predetermined reference optical flux of the EM transmitted by the optical security pathway is received by the receiver. When the PCB is accessed, drilled, sawed, cut, etc., the optical EM transferred by optical security pathway is altered. An optical monitoring device that monitors the flux of the optical EM received by the receiver detects a change in flux, in relation to a reference flux, and passes a tamper signal that is received by one or more computer system devices to respond to the unauthorized physical access. For example, one or more cryptographic adapter card or computer system functions or secured crypto components may be disabled. The term optical flux, or the like, referred to herein, is the radiant flux or luminous flux of the optical EM transmitted by the optical security pathway.

Figure 1:
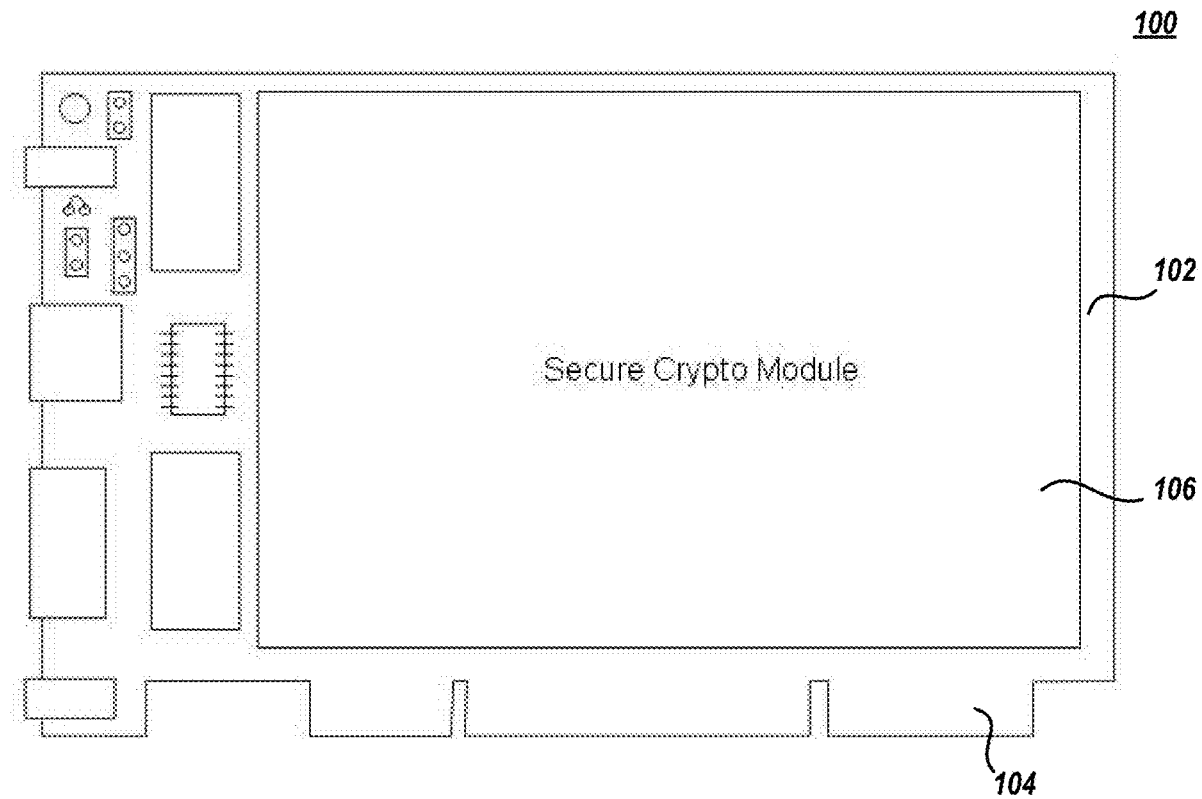
FIG. 1 illustrates an exemplary cryptographic adapter card including a secure crypto module that utilize various embodiments of the present invention.

Referring to the drawings, wherein like numbers denote like parts throughout the several views, FIG. 1 illustrates a cryptographic adapter card 100 that includes a secure crypto module 106. Cryptographic adapter card 100 includes a printed circuit board (PCB) 102 and connector 104 that can be inserted into an electrical connector, or expansion slot on a computer motherboard, backplane or riser to add cryptographic functionality to the computer via an expansion bus. PCB 102 provides mechanical support for various electronic components as well as electrically conductive pathways, also referred herein as traces, to provide for electrical communication (e.g., data transfer, etc.) as is known in the art. The computer motherboard, backplane or riser, hereinafter referred to as a motherboard, provides mechanical support for computer components such as a processor and memory and includes traces for electrical communication to and from the computer components, as is known in the art. The expansion bus, a particular mother board trace, is a computer bus which moves information between the internal hardware of the computer (e.g., the processor and memory) and peripheral devices.

Figure 2:
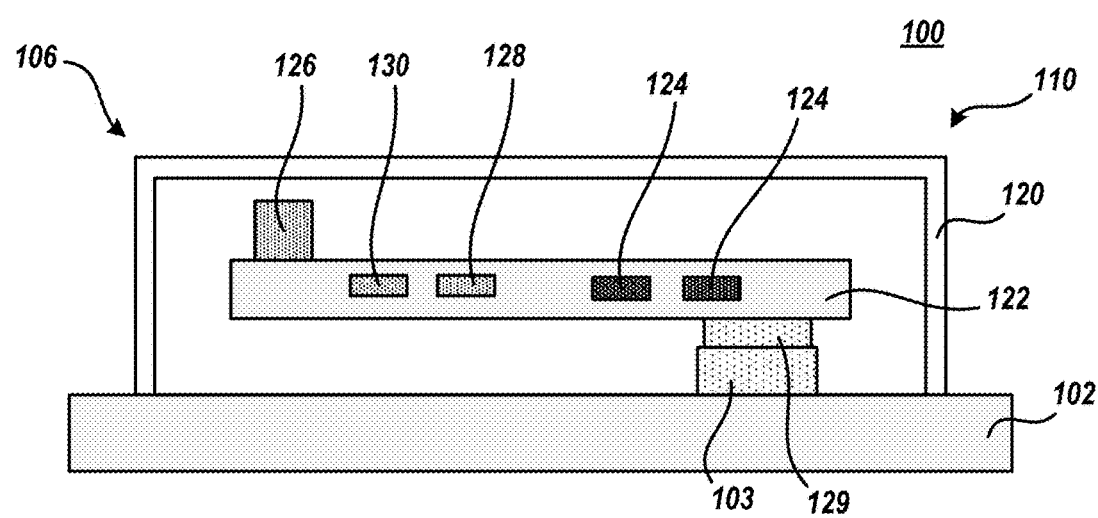
FIG. 2 illustrates an exemplary cross section of an exemplary cryptographic adapter card that includes a cryptographic printed circuit board (PCB) module, according to various embodiments of the present invention.

Secure crypto module 106 provides a complete envelope of protection around a cryptographic PCB module 110, exemplarily shown in FIG. 2, to detect and respond to unauthorized attempts at physical access or tampering therewith.

FIG. 2 illustrates an exemplary cross section of cryptographic adapter card 100. Secure crypto module 106 includes cryptographic PBC module 110 and shield 120. Cryptographic module 110 is a collective set of hardware that physically resides upon or imbedded within daughter PCB 122 or is software, firmware, etc. called by that hardware that which implements cryptographic logic or cryptographic processes, including cryptographic algorithms, and is contained within the perimeter boundary or shield 120 of the secure crypto module 106.

As is further described herein, PCB 102 and/or daughter PCB 122 includes an optical security pathway that detects unauthorized physical access attempts to the PCB. The optical security pathway may be located in various locations within the PCB buildup or stack. For example, the optical security pathway may be nearest the PCB upper surface or lower surface or may alternatively be located within an internal layer or portion of the PCB. Physical access of the PCB results in a change in luminous flux transferred by the optical security pathway. The change in luminous flux is detected and may result in the zeroization of area(s) of the one or more crypto components 124 where sensitive data is stored, disabling of the one or more crypto components 124, etc.

Cryptographic module 110 includes a daughter PCB 122 and one or more crypto devices 124. Cryptographic module 110 may further include battery 126, enable device 128, connector 103, connector 129, and monitor device 130. Daughter PCB 122 provides mechanical support for crypto devices 124 and for battery 126, enable device 128, and monitor device 130, when included within cryptographic module 110. Daughter PCB 122 includes electrical traces therein that provide for the connection of one or more crypto devices 124 to other electrical devices upon the daughter PCB 122, upon PCB 102, and/or upon the computer system motherboard, etc. Connector 129 electrically connects the daughter PCB 122 to PCB 102 via PCB connector 103.

The various connectors and traces contemplated herein generally allow for crypto devices 124 to electrically communicate with one or more computer components of the motherboard. When cryptographic adapter card 100 is not connected to the motherboard (where electrical potential is provided therefrom), battery 126 provides electric potential to enable device 128 to program or enable a destruct feature within each crypto device 124. The battery 126 may further provide backup power to one or more features of the cryptographic module 110 and may be active from the time of factory initialization until the end of the cryptographic module 110 expected product life.

Crypto devices 124 are hardware computer components that implement cryptographic logic or cryptographic processes or otherwise store or handle cryptographic data. A non-exhaustive list of crypto devices 124 are a coprocessor, memory (DRAM, Flash, ROM, RAM, etc.), FPGA, surface mount component, pin-in-hole component, socketed component, a circuit, an integrated circuit, etc.

Shield 120 is an enclosure, chassis, envelope, or other perimeter shell that generally surrounds and protects the internal cryptographic module 110. Shield 120 may be absent of access or air flow cutouts to limit access to the internal cryptographic module 110. In some implementations where crypto component 124, battery 126, enable device 128, and/or monitor device 130 need cooling, a heat sink may be thermally attached to the hardware and the fins or pins of the heat sink may protrude through the shield 120. In an embodiment, shield 120 may surround the cryptographic module 110 on at least five sides, the sixth side of cryptographic module 110 being protected by the printed circuit board 102. In another embodiment, shield 120 may surround the cryptographic module 110 on all six sides of the cryptographic module 110 with the sixth side includes a cutout to allow the daughter PCB 122 to be electrically connected to PCB 102 via connectors 129, 103. In embodiments, the shield 120 may be formed from sheet metal. By surrounding the internal cryptographic module 110, shield 120 generally forms a layer of protection of the cryptographic module 110 by limiting physical penetration thereto.

For clarity, crypto component 124, battery 126, enable device 128, and/or monitor device 130 may be surface mount components, pin-in-hole components, socketed components, circuits, etc. that are located upon daughter PCB 122. Further, crypto component 124, battery 126, enable device 128, and/or monitor device 130 may alternatively be imbedded within daughter PCB 122. For example, optical monitor device 130 may be an optical receiving integrated circuit upon or within daughter PCB 122. Similarly, one or more of the crypto components 124, battery 126, enable device 128, and/or monitor device 130 located upon or within daughter PCB 122 may be physically located upon or imbedded within PCB 102. In a particular embodiment, the optical security pathway and the optical monitor device 130 are located upon the top and bottom sides of a PCB portion and the crypto component 124, battery 126, enable device 128, etc. are located within the PCB portion. In this manner, the optical security pathway and the optical monitor device 130 generally form a perimeter detection boundary that surrounds and detects physical access attempts of the PCB portion or crypto component 124, battery 126, enable device 128, etc. there within.

Figure 3:
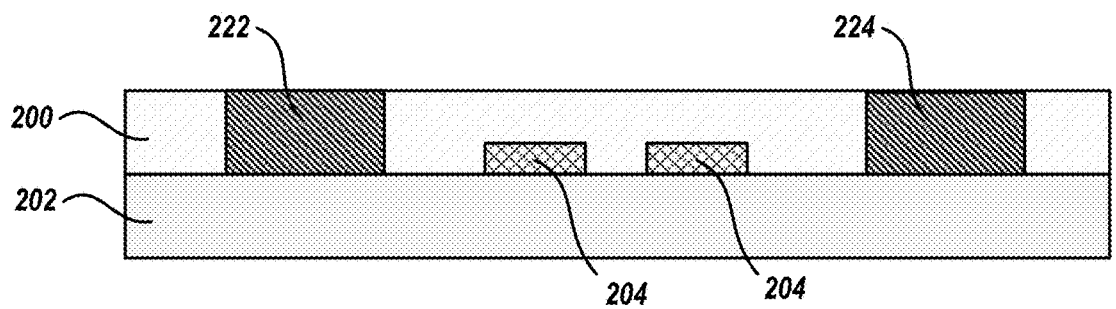
FIG. 3 illustrates an exemplary cross section view of a cryptographic adapter card PCB or a daughter PCB of the cryptographic PCB module, according to various embodiments of the present invention.

FIG. 3 illustrates an exemplary cross section view of cryptographic adapter card PCB 102 or daughter PCB 122 which includes an optical security pathway, according to various embodiments of the present invention. In an implementation of the cryptographic adapter card 100, only the PCB 102 and not daughter PCB 122 includes the optical security pathway. In another implementation of the cryptographic adapter card 100, only the daughter PCB 122 and not PCB 102 includes the optical security pathway. In yet another implementation of the cryptographic adapter card 100, both the PCB 102 and daughter PCB 122 include respective optical security pathways.

In an embodiment, as is shown in FIG. 3, one or more optical security pathways are formed from a transparent dielectric layer 200. Transparent dielectric layer 200 is generally optically transparent dielectric layer and may be Polytetrafluoroethylene (PTFE), Fluorinated ethylene propylene (FEP), and perfluoroalkylether (PFAE), or the like.

In the present embodiment, an optical security pathway is formed by optical EM (i.e., ultraviolet light, visible light, and infrared light) passing within or through transparent dielectric layer 200 from an optical EM emitter 222 to an optical EM receiver 224. In other words, transparent dielectric layer 200 is a medium for the transfer of optical electromagnetic radiation from optical EM emitter 222 to optical EM receiver 224. In an embodiment, transparent dielectric layer 200 is at least partially transparent (e.g. is translucent, etc.). For example, transparent dielectric layer 200 may be formed from a material that allows light to pass through the material without being scattered (i.e. transparent) or a material that allows a predetermined amount but less than all light to pass through the material (i.e. translucent).

Transparent dielectric layer 200 may be located upon a top surface of PCB 102, 122 and/or a bottom surface of PCB 102, 122. In other implementations, transparent dielectric layer 200 may be located generally between the top and bottom surfaces of PCB 102, 122. For example, transparent dielectric layer 200 may be formed upon a wiring layer in the PCB 102, 122 stack. For example, a wiring dielectric layer 202 may be formed utilizing known fabrication techniques. Wiring dielectric layer 202 is generally a dielectric layer associated with the fabrication of traces 204 thereupon. There may be multiple wiring dielectric layers 202 in the PCB 102, 122 stack. Subsequently, electrically conductive traces 204 may be formed upon the wiring layer. The transparent dielectric layer 200 may be subsequently formed upon the wiring layer and upon and separating electrically conductive traces 204. Generally, as there are many layers that may be formed to make up the PCB, transparent dielectric layer 200 may be formed upon a variety of PCB layers. For example, the transparent dielectric layer 200 may be formed upon an encapsulation layer that is formed upon the PCB to a thickness greater than the height of components located upon the PCB such that the encapsulation layer encapsulates the components.

In another embodiment, the PCB 102, 122 may include transparent dielectric layer 200 in its wiring layer stack. The wiring layers are the traditional wiring buildup of PCBs and may include conductive traces formed upon one or more layers of dielectric substrate material and/or transparent dielectric layer 200. The conductive traces 204 may be formed, e.g, by etching copper sheets that are laminated onto the dielectric substrate layer (e.g. prepreg, FR4, etc.) or transparent dielectric layer 200, by plating, printing, etc. conductive material upon the layer, etc. The traditional dielectric substrates are usually dielectric composite materials that contain a matrix, e.g. an epoxy resin and a reinforcement, e.g., a woven, sometimes nonwoven, glass fabric. The transparent dielectric layer 200 may be interleaved with traditional dielectric substrates in the wiring layer stack. An additional wiring layer may be formed by laminating a second dielectric substrate transparent dielectric layer 200 upon the conductive traces 204 and underlying layer. Conductive traces 204 on different layers may be connected with plated-through hole vias, blind vias, buried vias, etc. Components such as capacitors, resistors, active devices, crypto component 124, battery 126, enable device 128, and/or monitor device 130 may be imbedded within and connected to, formed by, etc. conductive traces 204 within wiring layer(s) of the PCB. Conductive traces 204 may be electrically connected to these components by known interconnection techniques and/or structures.

Optical EM emitter 222 is a hardware component that generally projects optical EM and optical EM receiver 224 is a hardware component that generally detects optical EM. Optical EM receiver 224 may be programmed with a predetermined reference optical EM flux value that which the optical EM receiver 224 may utilize to compare the actual flux of the detected optical EM thereto. For example, an expected flux value is stored in a register of the optical EM receiver 224. The predetermined expected flux value may be calculated by determining the actual distance between the EM receiver 224 and the EM emitter 222, by determining a transparency value that measures the degree of transparency of the material of the transparent dielectric layer 200, and by determining the actual flux of the optical EM emitted from EM emitter 222.

Implementations, the optical EM emitter 222 may be a laser, light emitting diode, or the like. The optical EM receiver 224 may be a photo diode, image sensor (e.g., complementary metal oxide semiconductor (CMOS) sensor, charge-coupled device (CCD) sensor), or the like.

The optical EM emitter 222 and/or optical EM receiver 224 may be located upon wiring layer 202. For example, optical EM emitter 222 and/or optical EM receiver 224 may be electrically connected to the wiring layer 202, traces 204 within wiring layer 202, etc. by known interconnection techniques and/or structures. The transparent dielectric layer 200 may be formed upon the wiring layer 202 to a thickness at least equal to the height of optical EM emitter 222 and/or optical EM receiver 224. For example, the top surface of optical EM emitter 222 and/or optical EM receiver 224 may be coplanar with the top surface of transparent dielectric layer 200.

Alternatively, a first transparent dielectric layer 200 may be formed upon wiring layer 202 and the optical EM emitter 222 and/or optical EM receiver 224 may be located upon the first transparent dielectric layer 200. For example, optical EM emitter 222 and/or optical EM receiver 224 may be located upon the first transparent dielectric layer 200 and electrically connected to the underlying wiring layer 202, traces 204 within wiring layer 202, etc. by known interconnection techniques and/or structures. A second transparent dielectric layer 200 may be formed upon the first second transparent dielectric layer 200, the second transparent dielectric layer 200 is formed to a thickness at least equal to the height of optical EM emitter 222 and/or optical EM receiver 224.

In an embodiment, at least the optical EM receiver 224 may be integral to, connected to, etc. optical monitor device 130 that monitors or detects when the received luminous flux by the optical EM receiver 224 is below the reference flux. In another embodiment, both the optical EM emitter 222 and optical EM receiver 224 are integral to, connected to, etc. optical monitor device 130. In this embodiment, the optical monitor device 130 controls the optical EM flux emitted by optical EM emitter 222 and determines a corresponding expected optical EM flux that should be received by optical EM receiver 224. The optical monitor device 130 may determine the expected optical EM flux by utilizing the optical EM flux emitted by optical EM emitter 222, predetermined value(s) associated with the distance between the optical EM emitter 222 and flux receiver 224 and predetermined transparency value(s) associated with the material of transparent dielectric layer 200. The optical monitor device may then detect when the actual received optical EM flux by the optical EM receiver 224 is below the expected optical EM flux.

In an embodiment, as is shown in FIG. 3, in addition to providing the medium for the transfer of optical electromagnetic radiation from optical EM emitter 222 to optical EM receiver 224, the transparent dielectric layer 200 may also physically and electrically separate adjacent traces 204 that are utilized in electrical communication of data handling signals between the applicable PCB and/or motherboard components.

Figure 4:
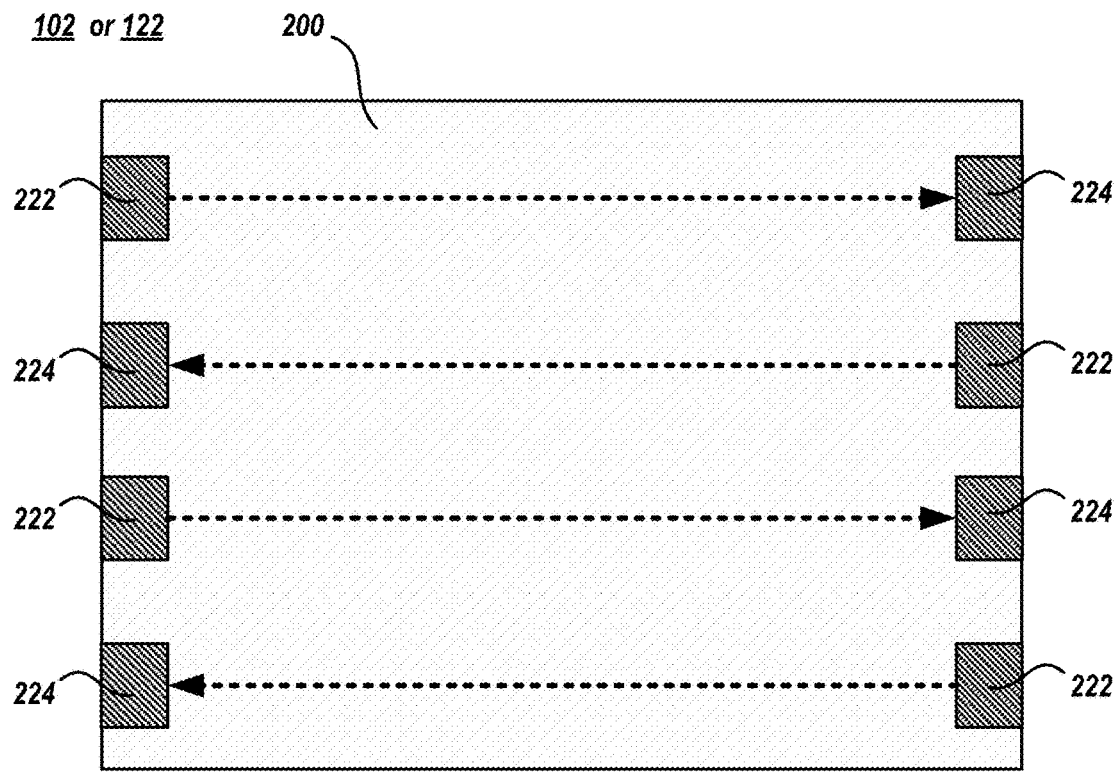
FIG. 4 illustrates an exemplary planar view of a cryptographic adapter card PCB or a daughter PCB of the cryptographic PCB module, according to various embodiments of the present invention.

FIG. 4 illustrates an exemplary planar view of cryptographic adapter card PCB 102 and/or a daughter PCB 122. The planar view may be a top surface section view of transparent dielectric layer 200. In the present embodiment, multiple optical EM emitters 222 and multiple optical EM receivers 224 are included upon the PCB 102 and/or daughter PCB 122. Each single optical EM emitter 222 is associated with a single optical EM receiver 224 such that most of the optical EM emitted by the single optical EM emitter 222 is transferred by transparent dielectric layer 200 and received by the associated single optical EM receiver 224. Though shown generally located on the side perimeter of cryptographic adapter card PCB 102 and/or a daughter PCB 122, optical EM emitter 222 and/or optical EM receiver 224 may be located entirely within the perimeter of cryptographic adapter card PCB 102 and/or a daughter PCB 122.

Figure 5:
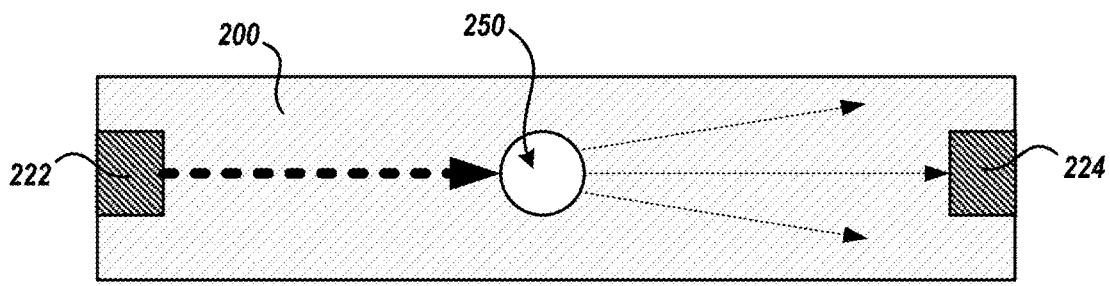
FIG. 5 illustrates an exemplary planar section view of a cryptographic adapter card PCB or a daughter PCB of the cryptographic PCB module, according to various embodiments of the present invention.

FIG. 5 illustrates an exemplary planar section view of cryptographic adapter card PCB 102 or a daughter PCB 122 subsequent to an unauthorized physical access thereof. The unauthorized physical access of PCB 102 and/or PCB 122 results in a void 250. The term "void" shall generally mean space created from the removal or displacement of PCB 102 and/or PCB 122 material. In the present embodiment, void 250 is the space created from the removal or displacement of transparent dielectric layer 200 material. Void 250 may be a hole (e.g. drill hole, etc.), trench (e.g., saw trench, knife trench, etc.) within the PCB stack. The void 250, in the present embodiment, intrudes into transparent dielectric layer 200. The void 250 is may be the result of an unauthorized attempt to access, probe, etc. a trace 204 within wiring layer 202 to reverse engineer cryptographic functions carried out by PCB 102, 122, etc.

As a result of void 250, EM emitted from optical EM emitter 222 is diffused. In other words, the void 250 generally interrupts and diffuses the transmission path of optical EM between the optical EM emitter 222 and optical EM receiver 224. When the optical EM intersects void 250, the optical EM diffuses, bounces off, reflects, etc. in numerous directions due to surface irregularities introduced by void 250 within the EM transmission path. Due to the diffusion, the optical EM received by optical EM receiver 224 is generally reduced. This reduction of optical EM received by optical EM receiver 224 is detected and generally triggers predetermined system faults or self-destruct function(s) to protect against unauthorized access of cryptographic data or unauthorized determination of cryptographic functionality. For example, upon EM receiver 224 detecting the reduced optical EM, area(s) of the computer where sensitive data is stored may be zeroed and/or one or more cryptographic or other functions of the computer may be permanently disabled. For example, the processor or memory of the computer may be disabled, an application program interface associated with cryptographic functions carried about by secure crypto module 106 may be disabled, a bus that transfers data between the processor and the cryptographic adapter card 100 may be disabled, etc.

By utilizing multiple optical EM emitters 222 and multiple optical EM receivers 224, a large area (e.g., most of the area, etc.) of the transparent dielectric layer 200 transmits optical EM. In this manner, it is probable that void 250 at any location of transparent dielectric layer 200 results in the reduction of received optical EM at a particular EM receiver 224.

Figure 6:
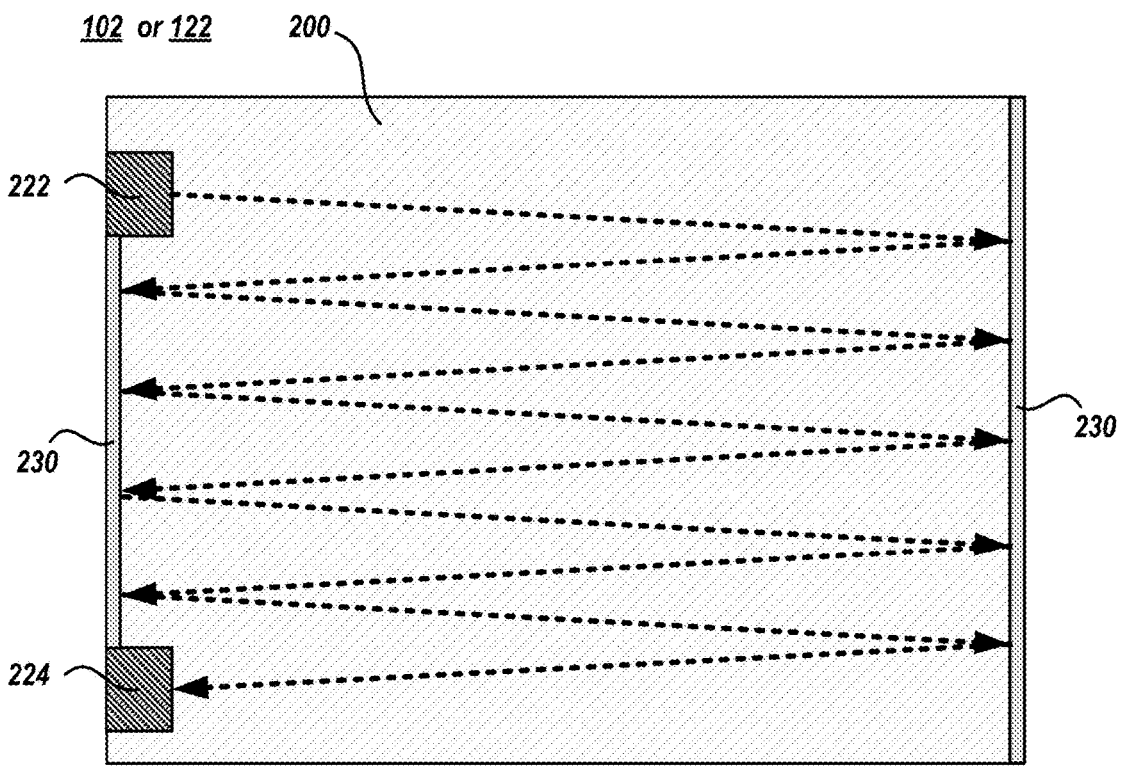
FIG. 6 illustrates an exemplary planar view of a cryptographic adapter card PCB or a daughter PCB of the cryptographic PCB module, according to various embodiments of the present invention.

FIG. 6 illustrates an exemplary planar view of cryptographic adapter card PCB 102 and/or a daughter PCB 122. The planar view may be a top surface section view of transparent dielectric layer 200. In the present embodiment, a single optical EM emitter 222, a single optical EM receiver 224, and one or more mirrors 230 are included upon the PCB 102 and/or daughter PCB 122. The single optical EM emitter 222 is associated with the single optical EM receiver 224 such that most of the optical EM emitted by the single optical EM emitter 222 is transferred by transparent dielectric layer 200 and received by the single optical EM receiver 224. Though shown generally located on the similar side perimeter of cryptographic adapter card PCB 102 and/or a daughter PCB 122, optical EM emitter 222 and/or optical EM receiver 224 may be located entirely on different perimeter sides, within the perimeter, etc. of cryptographic adapter card PCB 102 and/or a daughter PCB 122. A mirror 230 or a series of mirrors 230 are included to reflect the optical EM emitted by optical EM emitter 222. The mirror 230 or a series of mirrors 230 may be positioned on the perimeter of PCB 102 and/or a daughter PCB 122 adjacent to the transparent dielectric layer 200 such that the optical EM does not escape from the transparent dielectric layer 200. The series of mirrors 230 may be positioned to perfectly reflect (i.e. the flux of the optical EM incoming to the mirror equals the flux of the optical EM outgoing from the mirror) the optical EM within the transparent dielectric layer 200.

Figure 7:
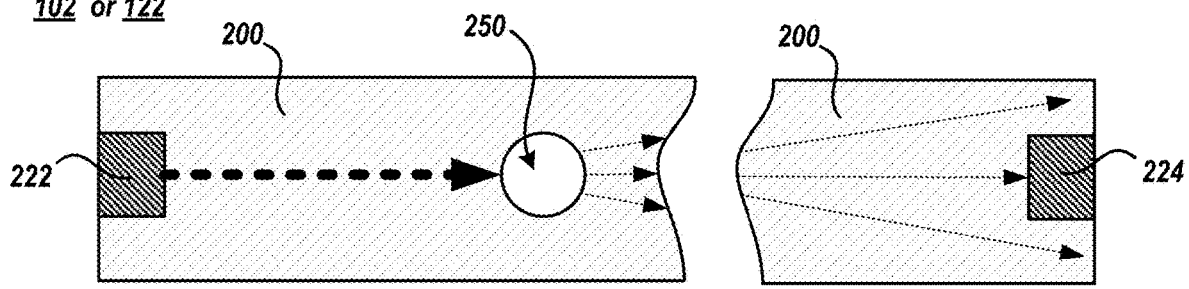
FIG. 7 illustrates an exemplary planar section view of a cryptographic adapter card PCB or a daughter PCB of the cryptographic PCB module, according to various embodiments of the present invention.

FIG. 7 illustrates an exemplary planar section view of cryptographic adapter card PCB 102 or a daughter PCB 122 subsequent to an unauthorized physical access thereof. The unauthorized physical access of PCB 102 and/or PCB 122 results in void 250. In the present embodiment, void 250 is the space created from the removal or displacement of transparent dielectric layer 200 material. The void 250, in the present embodiment, intrudes into transparent dielectric layer 200 and may be the result of an unauthorized attempt to access, probe, etc. a particular trace 204 within wiring layer 202 to reverse engineer cryptographic functions carried out by PCB 102, 122, etc.

As a result of void 250, EM emitted from optical EM emitter 222 is diffused. Due to the diffusion, the optical EM received by optical EM receiver 224 is generally reduced. This reduction of optical EM received by optical EM receiver 224 is detected and generally triggers predetermined system faults or self-destruct function(s) to protect against unauthorized access of cryptographic data or unauthorized determination of cryptographic functionality.

By utilizing the single optical EM emitter 222, single optical EM receiver 224, and at least one mirror 230, a large area (e.g., most of the area, etc.) of the transparent dielectric layer 200 transmits optical EM. In this manner, it is probable that void 250 at any location of transparent dielectric layer 200 results in the reduction of received optical EM at a particular EM receiver 224.

Figure 8:
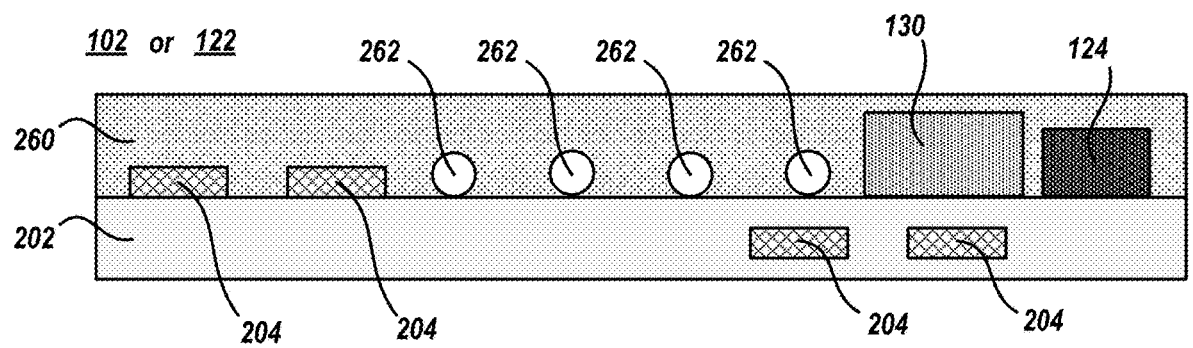
FIG. 8 illustrates an exemplary cross section view of a cryptographic adapter card PCB or a daughter PCB of the cryptographic PCB module, according to various embodiments of the present invention.

FIG. 8 illustrates an exemplary cross section view of a cryptographic adapter card PCB 102 or a daughter PCB 122 which includes an optical security pathway according to various embodiments of the present invention. In the embodiment, as is shown in FIG. 8, one or more optical security pathways are formed from a waveguide 262.

In the present embodiment, the optical security pathway is formed by optical EM passing within or through waveguide 262 from an optical EM emitter 222 to an optical EM receiver 224. In other words, waveguide 262 is a medium for the transfer of optical EM from optical EM emitter 222 to optical EM receiver 224.

The transmission of the optical EM via waveguide 262 may also be referred to as guided wave transmission. The material of waveguide 262 may be selected depending upon the known or expected optical EM wavelength of the emitted optical EM from emitter 222. Waveguide 262 may be fiber optical cable, or the like.

Waveguide 262 may be a dielectric fiber that transmits light along its axis by the process of total internal reflection. Waveguide 262 may consist of a core surrounded by a cladding layer. To confine the optical EM in the core, the refractive index of the core is greater than that of the cladding. When optical EM traveling in waveguide 262 hits the cladding at a steep angle, the optical EM will be completely reflected and confined in the core. The optical EM travels along the waveguide 262 bouncing back and forth off the boundary. Because the optical EM must strike the boundary with an angle greater than the critical angle, optical EM that enters the waveguide 262 within a certain range of angles is propagated. This range of angles is the acceptance cone of the waveguide 262. The size of the acceptance cone is a function of the refractive index difference between the waveguide 262 core and cladding.

Waveguide 262 may be located upon a top surface of PCB 102, 122 and/or a bottom surface of PCB 102, 122. In other implementations, waveguide 262 may be located generally between the top and bottom surfaces of PCB 102, 122. For example, waveguide 262 may be placed upon a wiring layer of the PCB 102, 122 stack. For example, a wiring dielectric layer 202 may be formed utilizing known fabrication techniques. Subsequently, electrically conductive traces 204 may be formed upon the wiring layer 204. The waveguide 262 may be subsequently placed, positioned, or the like upon the wiring layer 202. In an embodiment, waveguide 262 may be directly adjacent to and physically and electrically separating adjacent traces 204. Generally, as there are many layers that may be formed to make up the PCB, waveguide 262 may be formed upon a variety of the PCB layers that make up the PCB layer stack. For example, the PCB 102, 122 may include one or more waveguides 262 in its wiring layer(s) stack.

In an embodiment, as is depicted in FIG. 8, one or more traces 204, optical monitor device 130, and one or more crypto components 124 are formed upon wiring layer 202 of PCB 102 and/or PCB 122. Waveguide 262 is placed or otherwise routed upon wiring layer 204. A first end of the waveguide 262 is connected to optical EM emitter 222 and a second end of the waveguide 262 is connected to optical EM receiver 224. The optical EM emitter 222 and/or optical EM receiver 224 may be located within optical monitor device 130.

Subsequently, an encapsulation layer 260 may be formed upon the wiring layer 202, upon the traces 204, upon optical monitor device 130, upon the one or more crypto components 124, and upon the waveguide 262. The encapsulation layer 260 may be formed to a thickness greater than a maximum height of the traces 204, optical monitor device 130, the one or more crypto components 124, or upon the waveguide 262. In other words, encapsulation layer 260 generally has a thickness greater than the height of PCB 102, 122 surface features. In some instances, encapsulation layer 260 may be a known resin that is a conforming material coated upon the wiring layers 202 that conforms to the contours of the PCB. As is known in the art, the resin may be visually opaque. The encapsulation layer 260 may generally protect the wiring layer(s) 202 against moisture, dust, chemicals, and temperature extremes that, if uncoated (non-protected), could result in damage or failure of the electronics mounted upon or imbedded within wiring layer(s) 202 to function. The encapsulation layer 260 may be formed from by known fabrication techniques and may be formed from an epoxy, polyurethane, resin, silicon, or the like, material.

In an embodiment, at least the optical EM receiver 224 may be integral to, connected to, etc. optical monitor device 130 that monitors or detects when the received luminous flux by the optical EM receiver 224 is below the reference flux. In another embodiment, both the optical EM emitter 222 and optical EM receiver 224 are integral to, connected to, etc. optical monitor device 130. In this embodiment, the optical monitor device 130 controls the optical EM flux emitted by optical EM emitter 222 and determines a corresponding expected optical EM flux that should be received by optical EM receiver 224. The optical monitor device 130 may determine the expected optical EM flux by utilizing the optical EM flux emitted by optical EM emitter 222, predetermined value(s) associated with the distance between the optical EM emitter 222 and optical EM receiver 224 and predetermined transparency value(s) associated with the waveguide 262. The optical monitor device may then detect when the actual received optical EM flux by the optical EM receiver 224 is below the expected optical EM flux.

In an embodiment, in addition to providing the medium for the transfer of optical electromagnetic radiation from optical EM emitter 222 to optical EM receiver 224, the waveguide 262 may also physically and electrically separate adjacent traces 204 that are utilized in electrical communication of data handling signals between the applicable PCB and/or motherboard components.

Figure 9:
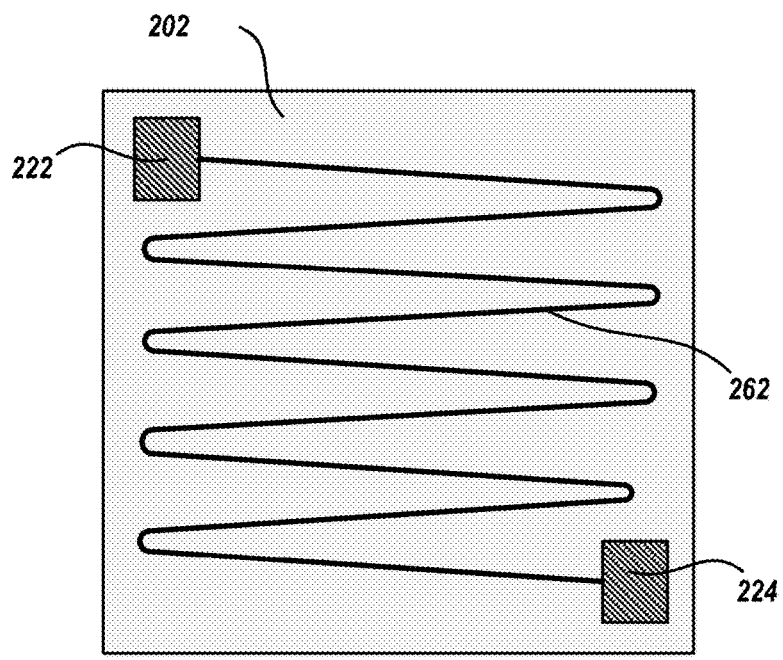
FIG. 9 illustrates an exemplary planar view of a cryptographic adapter card PCB or a daughter PCB of the cryptographic PCB module, according to various embodiments of the present invention.

FIG. 9 illustrates an exemplary planar view of cryptographic adapter card PCB 102 and/or a daughter PCB 122. The planar view may be a top surface view of wiring layer 202. In the depicted embodiment, a single optical EM emitter 222 and single optical EM receiver 224 is included upon the PCB 102 and/or daughter PCB 122. The single optical EM emitter 222 is associated with the single optical EM receiver 224 and single waveguide 262 such that most of the optical EM emitted by the single optical EM emitter 222 is transferred by the single waveguide 262 and received by the associated single optical EM receiver 224. In another embodiment, multiple optical EM emitters 222, multiple optical EM receivers 224, and multiple waveguides 262 are included upon the PCB 102 and/or daughter PCB 122. Each single optical EM emitter 222 is associated with a single optical EM receiver 224 and a single waveguide 262 such that most of the optical EM emitted by the single optical EM emitter 222 is transferred by the single waveguide 262 and received by the associated single optical EM receiver 224.

Figure 10:
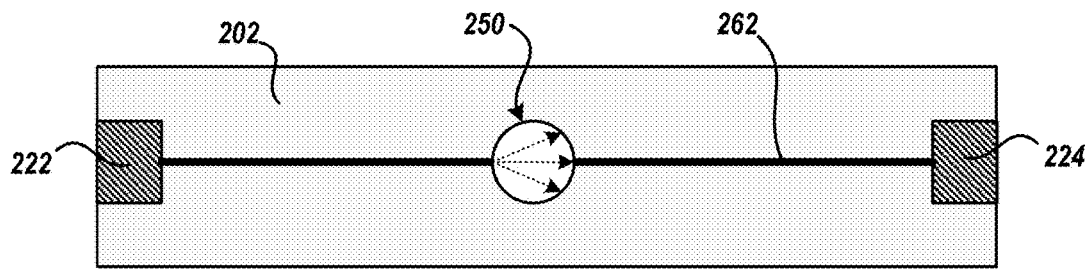
FIG. 10 illustrates an exemplary planar section view of a cryptographic adapter card PCB or a daughter PCB of the cryptographic PCB module, according to various embodiments of the present invention.

FIG. 10 illustrates an exemplary planar section view of cryptographic adapter card PCB 102 or a daughter PCB 122 subsequent to an unauthorized physical access thereof. The unauthorized physical access of PCB 102 and/or PCB 122 results in a void 250. In the present embodiment, void 250 is the space created from the removal or displacement of at least waveguide 262 material. Void 250 may be a hole (e.g. drill hole, etc.), trench (e.g., saw trench, knife trench, etc.) within the PCB stack. The void 250, in the present embodiment, intrudes into waveguide 262. As a result of void 250, EM emitted from optical EM emitter 222 is diffused. In other words, the void 250 generally interrupts and diffuses or eliminates the transmission path of optical EM between the optical EM emitter 222 and optical EM receiver 224. When the optical EM intersects void 250, the optical EM diffuses, bounces off, reflects, etc. in numerous directions due to surface irregularities introduced by void 250 within the EM transmission path reducing continued EM transmission past void 250. For example, on the emission side of void 250, optical EM may be emitted from the waveguide 262. The transmission of optical EM is much less efficient through void 250 relative to the waveguide 262. Some of the optical EM emitted from waveguide 262 may be transferred through void 250 and into the waveguide 262 at the emitter side of void 250. The amount of optical EM into the waveguide 262 at the emitter side of void 250 is less than the amount of optical EM emitted from emitter 222 and is received by optical EM receiver 224.

Due to the void 250 intersecting waveguide 262, the optical EM received by optical EM receiver 224 is generally reduced. This reduction of optical EM received by optical EM receiver 224 is detected and generally triggers predetermined system faults or self-destruct function(s) to protect against unauthorized access of cryptographic data or unauthorized determination of cryptographic functionality. For example, upon EM receiver 224 detecting the reduced optical EM, area(s) of the computer where sensitive data is stored may be zeroed and/or one or more cryptographic or other functions of the computer may be permanently disabled. For example, the processor or memory of the computer may be disabled, an application program interface associated with cryptographic functions carried about by secure crypto module 106 may be disabled, a bus that transfers data between the processor and the cryptographic adapter card 100 may be disabled, etc.

By utilizing multiple optical EM emitters 222, multiple optical EM receivers 224, and multiple waveguides 262 a large area (e.g., most of the area, etc.) PCB is transverse by waveguides 262. In this manner, it is probable that void 250 at any location of the PCB would intersect any particular waveguide 262 and results in the reduction of received optical EM at a particular EM receiver 224. Similarly, by utilizing a single optical EM emitter 222, a single optical EM receiver 224, and a single waveguide 262 routed upon a large area (e.g., a majority of the area, etc.) of the PCB, it is probable that a void 250 at any location of the PCB would intersect the single waveguide 262 and result in the reduction of received optical EM at the single EM receiver 224.

Figure 11:
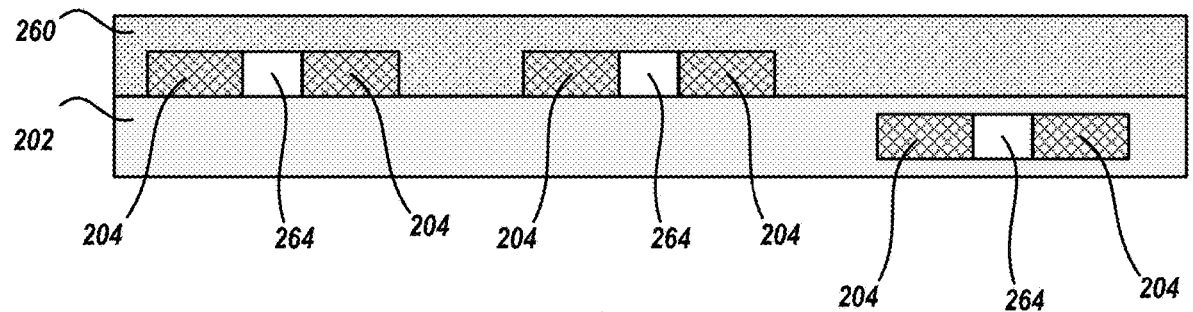
FIG. 11 illustrates an exemplary cross section view of a cryptographic adapter card PCB or a daughter PCB of the cryptographic PCB module, according to various embodiments of the present invention.

FIG. 11 illustrates an exemplary cross section view of a cryptographic adapter card PCB 102 or a daughter PCB 122 which includes an optical security pathway according to various embodiments of the present invention. In the embodiment, as is shown in FIG. 11, one or more optical security pathways are formed from a waveguide 264.

In the present embodiment, the optical security pathway is formed by optical EM passing within or through waveguide 264 from an optical EM emitter 222 to an optical EM receiver 224. In other words, waveguide 264 is a medium for the transfer of optical EM from optical EM emitter 222 to optical EM receiver 224.

The transmission of the optical EM via waveguide 264 may also be referred to as guided wave transmission. The material of waveguide 264 may be selected depending upon the known or expected optical EM wavelength of the emitted optical EM from emitter 222. Waveguide 264 is a dielectric material fabricated upon a PCB layer (e.g. wiring layer 202, etc.) between and contacting adjacent traces 204.

Waveguide 264 may be a dielectric material that transmits light along its axis by the process of total internal reflection. Waveguide 264 may consist of a core surrounded by a cladding layer. To confine the optical EM in the core, the refractive index of the core is greater than that of the cladding. When optical EM traveling in waveguide 264 hits the cladding at a steep angle, the optical EM will be completely reflected and confined in the core. The optical EM travels along the waveguide 264 bouncing back and forth off the boundary. Because the optical EM must strike the boundary with an angle greater than the critical angle, optical EM that enters the waveguide 264 within a certain range of angles is propagated. This range of angles is the acceptance cone of the waveguide 264. The size of the acceptance cone is a function of the refractive index difference between the waveguide 264 core and cladding.

Waveguide 264 may be located upon a top surface of PCB 102, 122 and/or a bottom surface of PCB 102, 122. In other implementations, waveguide 264 may be located generally between the top and bottom surfaces of PCB 102, 122. For example, waveguide 264 may be formed upon a wiring layer of the PCB 102, 122 stack wherein the wiring layer 202 may be formed utilizing known fabrication techniques. Subsequently, electrically conductive traces 204 may be formed upon the wiring layer 204. The waveguide 264 may be subsequently formed upon the wiring layer 202 between adjacent traces 204. Generally, as there are many layers that may be formed to make up the PCB, waveguide 264 may be formed upon a variety of the PCB layers that make up the PCB layer stack.

In an embodiment, one or more traces 204, optical monitor device 130, and one or more crypto components 124 are formed upon wiring layer 202 of PCB 102 and/or PCB 122. Waveguide 264 is formed upon wiring layer 204. A first end of the waveguide 264 is connected to optical EM emitter 222 and a second end of the waveguide 264 is connected to optical EM receiver 224. The optical EM emitter 222 and/or optical EM receiver 224 may be located within optical monitor device 130.

Subsequently, an encapsulation layer 260 may be formed upon the wiring layer 202, upon the traces 204, upon optical monitor device 130, upon the one or more crypto components 124, and upon the waveguide 264. The encapsulation layer 260 may be formed to a thickness greater than a maximum height of the traces 204, optical monitor device 130, the one or more crypto components 124, or the waveguide 264. In other words, encapsulation layer 260 generally has a thickness greater than the height of PCB 102, 122 surface features. In some instances, encapsulation layer 260 may be a known resin that is a conforming material coated upon the wiring layers 202 that conforms to the contours of the PCB. As is known in the art, the resin may be visually opaque. The encapsulation layer 260 may generally protect the wiring layer(s) 202 against moisture, dust, chemicals, and temperature extremes that, if uncoated (non-protected), could result in damage or failure of the electronics mounted upon or imbedded within wiring layer(s) 202 to function. The encapsulation layer 260 may be formed from by known fabrication techniques and may be formed from an epoxy, polyurethane, resin, silicon, or the like, material.

In an embodiment, at least the optical EM receiver 224 may be integral to, connected to, etc. optical monitor device 130 that monitors or detects when the received luminous flux by the optical EM receiver 224 is below the reference flux. In another embodiment, both the optical EM emitter 222 and optical EM receiver 224 are integral to, connected to, etc. optical monitor device 130. In this embodiment, the optical monitor device 130 controls the optical EM flux emitted by optical EM emitter 222 and determines a corresponding expected optical EM flux that should be received by optical EM receiver 224. The optical monitor device 130 may determine the expected optical EM flux by utilizing the optical EM flux emitted by optical EM emitter 222, predetermined value(s) associated with the distance between the optical EM emitter 222 and optical EM receiver 224 and predetermined transparency value(s) associated with the waveguide 264. The optical monitor device may then detect when the actual received optical EM flux by the optical EM receiver 224 is below the expected optical EM flux.

Figure 12:
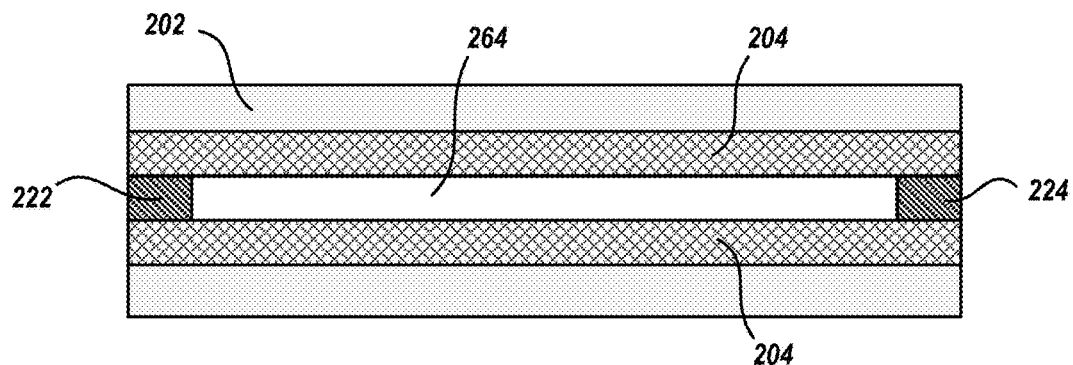
FIG. 12 and FIG. 13 illustrate exemplary planar views of a cryptographic adapter card PCB or a daughter PCB of the cryptographic PCB module, according to various embodiments of the present invention.

FIG. 12 illustrates an exemplary planar section view of cryptographic adapter card PCB 102 and/or a daughter PCB 122. The planar view may be a top surface view of wiring layer 202. In the depicted embodiment, a single optical EM emitter 222, a single optical EM receiver 224, and a single waveguide 264 is included upon the PCB 102 and/or daughter PCB 122 between traces 204. The single optical EM emitter 222 is associated with the single optical EM receiver 224 and single waveguide 264 such that most of the optical EM emitted by the single optical EM emitter 222 is transferred by the single waveguide 264 and received by the associated single optical EM receiver 224. Though, one series of optical EM emitter 222, optical EM receiver 224, and waveguide 264 are depicted, there may be multiple series of EM emitter 222, optical EM receiver 224, and waveguide 264 included upon the PCB.

Figure 13:
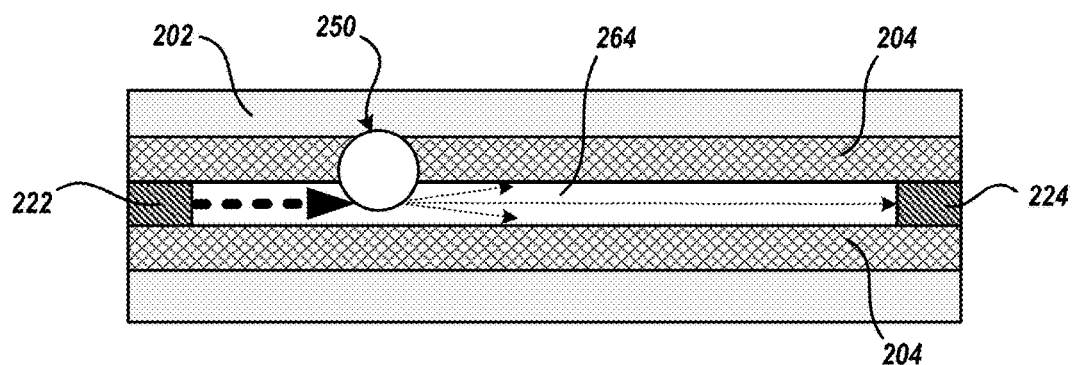

FIG. 13 illustrates an exemplary planar section view of cryptographic adapter card PCB 102 or a daughter PCB 122 subsequent to an unauthorized physical access thereof. The unauthorized physical access of PCB 102 and/or PCB 122 results in a void 250. In the present embodiment, void 250 is the space created from the removal or displacement of at least waveguide 264 material. Void 250 may be a hole (e.g. drill hole, etc.), trench (e.g., saw trench, knife trench, etc.) within the PCB stack. The void 250 generally intrudes or intersects into waveguide 264. As a result of void 250, EM emitted from optical EM emitter 222 is diffused. In other words, the void 250 generally interrupts and diffuses or eliminates the transmission path of optical EM between the optical EM emitter 222 and optical EM receiver 224. When the optical EM intersects void 250, the optical EM diffuses, bounces off, reflects, etc. in numerous directions due to surface irregularities introduced by void 250 within the EM transmission path reducing continued EM transmission past void 250. For example, on the emission side of void 250, optical EM may be emitted from the waveguide 264. The transmission of optical EM is much less efficient through void 250 relative to the waveguide 264. Some of the optical EM emitted from waveguide 264 may be transferred through void 250 and into the waveguide 264 at the emitter side of void 250. The amount of optical EM into the waveguide 264 at the emitter side of void 250 is less than the amount of optical EM emitted from emitter 222 and is received by optical EM receiver 224.

Due to the void 250 intersecting waveguide 264, the optical EM received by optical EM receiver 224 is generally reduced. This reduction of optical EM received by optical EM receiver 224 is detected and generally triggers predetermined system faults or self-destruct function(s) to protect against unauthorized access of cryptographic data or unauthorized determination of cryptographic functionality. For example, upon EM receiver 224 detecting the reduced optical EM, area(s) of the computer where sensitive data is stored may be zeroed and/or one or more cryptographic or other functions of the computer may be permanently disabled. For example, the processor or memory of the computer may be disabled, an application program interface associated with cryptographic functions carried about by secure crypto module 106 may be disabled, a bus that transfers data between the processor and the cryptographic adapter card 100 may be disabled, etc.

By utilizing multiple series of optical EM emitters 222, multiple optical EM receivers 224, and multiple waveguides 264 between respective adjacent traces 204, a large area (e.g., most of the area, etc.) PCB is transverse by waveguides 264. In this manner, it is probable that void 250 at any location of the PCB would intersect any waveguide 264 and results in the reduction of received optical EM at a particular optical EM receiver 224.

Figure 14:
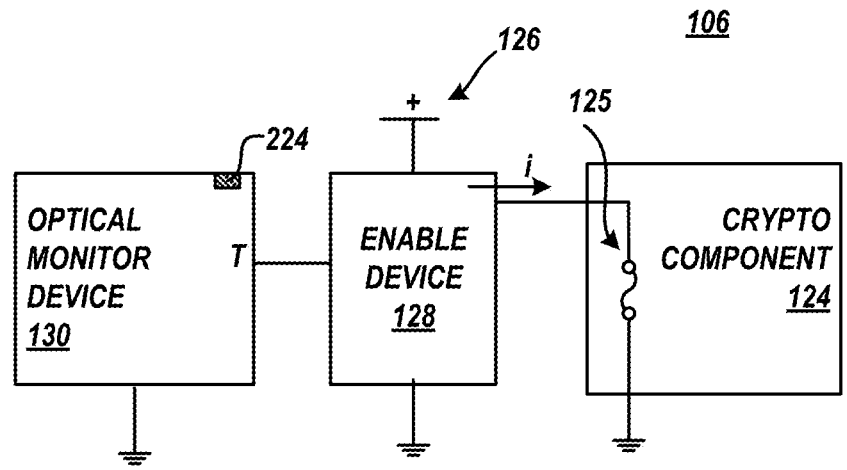
FIG. 14 illustrates a block circuit diagram of a secure crypto module that utilizes various embodiments of the present invention.

FIG. 14 illustrates an exemplary block circuit diagram of secure crypto module 106 that utilizes various embodiments of the present invention. Optical monitor device 130 at least includes or is electrically connected to optical EM receiver 224. Optical monitor device 130 may further included or further is electrically connected to optical EM emitter 222. Further, monitor device 130 is communicatively connected to enable device 128 in that it may communicate a tamper signal from monitor device 130 to enable device 128. Monitor device 130 is an electrical component or circuit that measures received EM flux that was transferred upon the optical security pathway and received by optical EM receiver 224. In various embodiments, optical monitor device 130 may be an application specific integrated circuit (ASIC), field programmable gate array (FPGA), etc.

Optical monitor device 130 continuously, periodically, etc. determines whether the optical EM flux received at optical EM receiver 224 is the expected EM flux. For example, optical monitor device 130 compares the actual received EM flux to the predetermined expected EM flux. When the actual received EM flux is less than the predetermined expected EM flux, optical monitor device 130 may generate and send an enable signal to an intermediary device, such as enable device 128 or directly to crypto component 124. For example, a default signal generated and sent from monitor device 130 to enable device 128 may be a low "0" signal. Upon the monitor device 130 detecting the received EM flux is less than the expected received EM flux, the enable signal is generated and sent from monitor device 130 to enable device 128 as a high "1" signal indicating that the optical security pathway has been accessed resulting in void 250.

Enable device 128 has or is connected to electrical potential and connected to a destruct feature 125 within crypto component 124. The electrical potential may be the power supply of cryptographic adapter card PCB 122 or motherboard PCB 102 if the system is in operation. If the system is non-operational or the system power supply is unavailable, the electrical potential is battery 126. Upon receipt of the enable signal, enable device 128 directs current to destruct feature 125 thereby programming the destruct feature 125. In an embodiment, destruct feature 125 may be a fuse or other one time programmable logic device. The programming of the destruct feature 125 may result in zeroization of area(s) of the one or more crypto components 124 where sensitive data is stored, disables the crypto component 124, etc.

Figure 15:
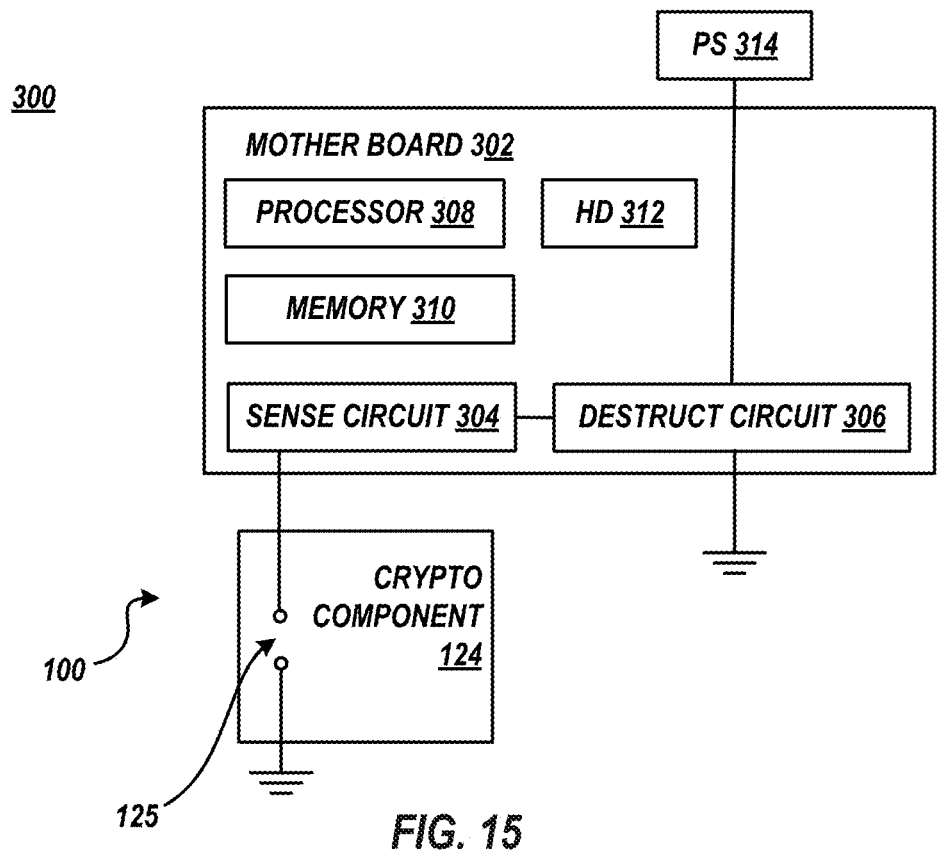
FIG. 15 illustrates of block diagram of a computer including a secure crypto module that utilizes various embodiments of the present invention.

FIG. 15 illustrates of block diagram of a computer 300 including a cryptographic adapter card 100 that utilizes various embodiments of the present invention. In addition to computer devices such as memory 310, processor 308, etc., the computer motherboard 302 also includes a sense circuit 304 and a destruct circuit 306. The sense circuit 304 senses, monitors, or otherwise detects that destruct feature 125 has been programmed within one or more crypto components 124. Destruct circuit 306 is connected to a power supply 314, such as the power supply of computer 300. Upon sense circuit 304 determining destruct feature 125 within one or more crypto components 124 has been programmed, destruct circuit 306 zeros area(s) of the computer 300 where sensitive data is stored (e.g., a hard drive 312, memory 310, etc.) and one or more functions of the computer 300 are permanently disabled. For example, the processor 308 or memory 310 may be disabled; an application program interface associated with crypto functions of secure crypto module 106 may be disabled, a data bus for communicating data between the processor 308 and the cryptographic adapter card 100 may be disabled, etc.

Figure 16:
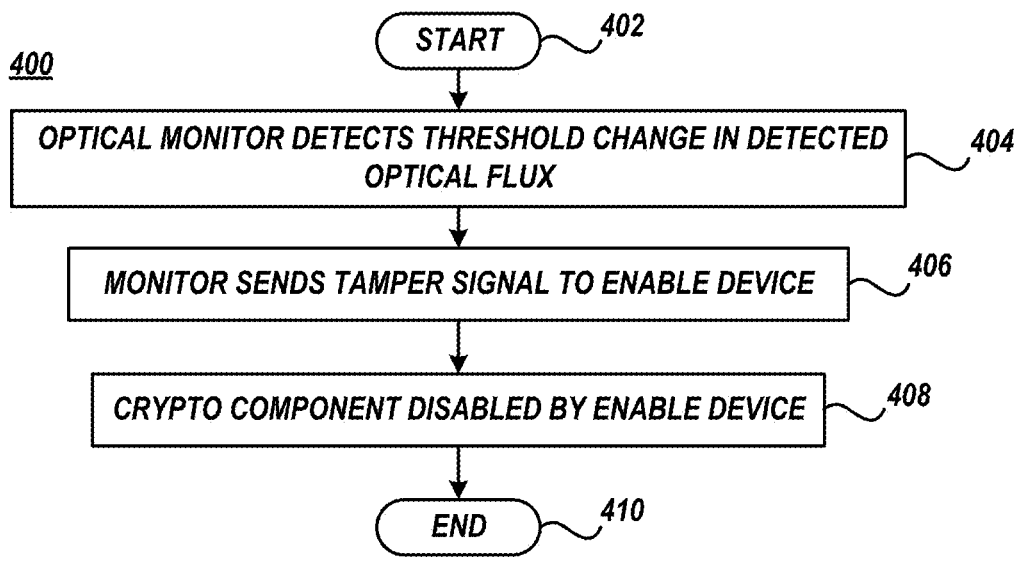
FIG. 16 and FIG. 17 illustrate exemplary methods of detecting and responding to an unauthorized attempt of physical access, according to various embodiments of the present invention.

FIG. 16 illustrates an exemplary method 400 of detecting and responding to an unauthorized attempt of physical access, according to various embodiments of the present invention. Method 400 may be utilized by a cryptographic adapter card 100 that includes secure crypto module 106, crypto component 124, optical monitor device 130, and an optical security pathway.

Method 400 begins at block 402 and continues by optical monitor device 130 detecting that optical EM receiver 224 has received or detected EM flux less than the predetermined expected EM flux by a predetermined threshold amount (block 404) which indicates that the optical security pathway has been accessed.

Method 400 may continue with the optical monitor device 130 sending a tamper signal to enable device 128 (block 406). For example, the optical monitor device 130 sends a high "1" tamper or enable signal to enable device 128 to generally instruct enable device 128 to program a destruct feature 125 within crypto component 124.

Method 400 may continue with crypto component 124 being disabled by the enable device 128 (block 408). For example, the programming of destruct feature 125 results in zeroization of area(s) of the one or more crypto components 124 where sensitive data is stored, renders the crypto component 124 inoperable, causes the crypto component 124 to perform spoof functions, causes the crypto component 124 to perform self-destruct functions, the activating of a tamper bit/byte within a crypto component 124 register, etc. Method 400 ends at block 410.

Figure 17:
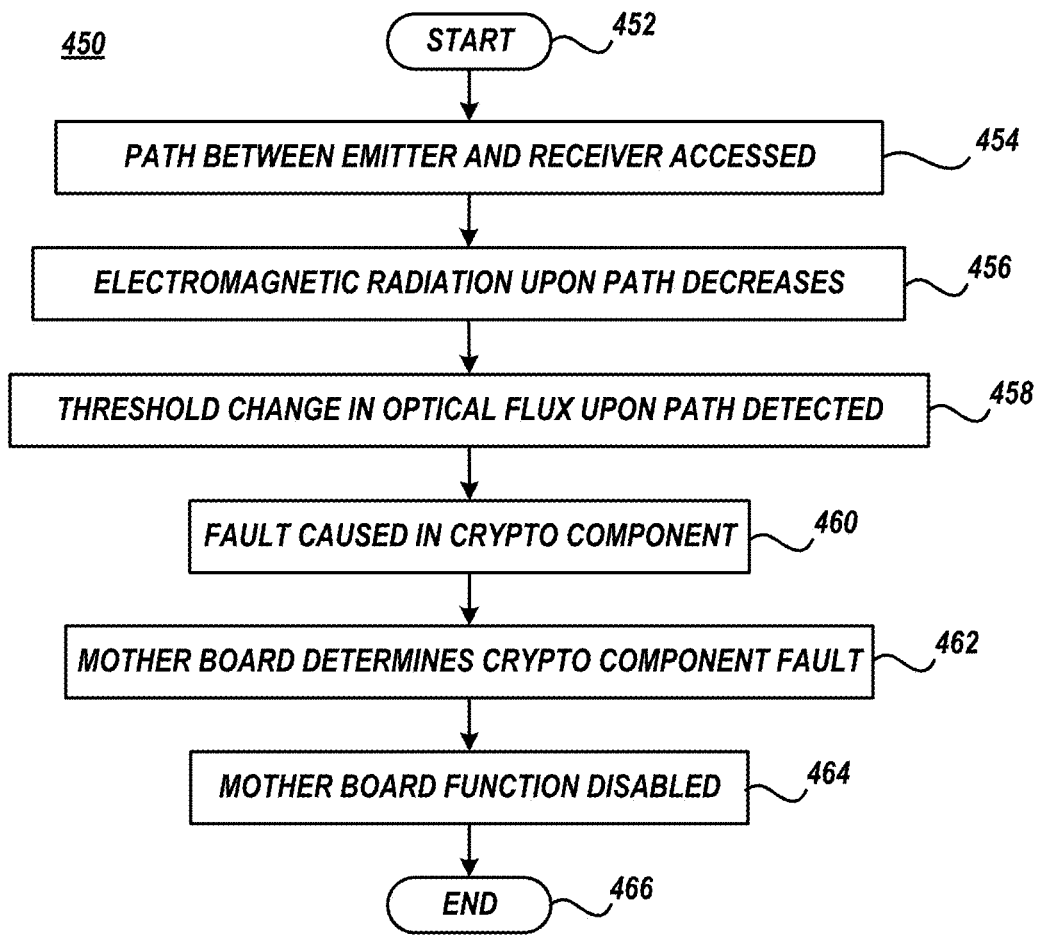

FIG. 17 illustrates an exemplary method 450 of detecting and responding to an unauthorized attempt of physical access, according to various embodiments of the present invention. Method 450 may be utilized by a computer 300 that includes a motherboard 302 that includes a sense circuit 304, and a destruct circuit 306, and a cryptographic adapter card 100 connected thereto. The cryptographic adapter card 100 includes a secure crypto module 106, crypto component 124, optical monitor device 130, and a transparent dielectric layer 200.

Method 450 begins at block 452 and continues with the optical security pathway being accessed (block 454). For example, a void 250 is formed that removes or displaces material of the transparent dielectric layer 200 that forms the optical security pathway as a result of an unauthorized physical access of the PCB. For example, a void 250 of 0.004 inches in diameter enters the transparent dielectric layer 200, etc. For clarity, the void 250 may have a diameter less than or greater than the referenced 0.004 inches.

Method 450 may continue with the optical EM transferred by the optical security pathway decreasing (block 456). For example, a first optical security pathway portion prior to void 250 transfers a first optical flux and a second optical security pathway portion after void 250 transfers a second optical flux; the second optical flux being less than the first optical flux due to the decrease of optical EM transferred through void 250.

Method 450 may continue with monitor device 130 detecting a predetermined threshold amount of optical flux reduction (block 458) which indicates that optical security pathway has been accessed.

Method 450 may continue with causing a fault in crypto component 124 (block 460). The fault may be generally the result of the programming of destruct feature 125 within crypto component 124. For example, the fault of crypto component 124 may result in zeroization of area(s) of the one or more crypto components 124 where sensitive data is stored, renders the crypto component 124 inoperable, causes the crypto component 124 to perform spoof functions, causes the crypto component 124 to perform self-destruct functions, causes the activation of a tamper bit/byte within a crypto component 124 register, etc.

Method 450 may continue with motherboard 302 determining that the crypto component 124 has faulted (block 462). The motherboard 302 sense circuit 304 determines, monitors, or otherwise detects that destruct feature 125 has been programmed causing the fault of crypto component 124.

Method 450 may continue with disabling functionality provided by motherboard 302 (block 464). The disabling of functionality is generally the result of detecting the programming of destruct feature 125 within crypto component 124. For example, the fault of crypto component 124 may result in zeroization of area(s) of memory 310, processor 308, hard drive 312, etc. where sensitive data is stored, renders the memory 310, processor 308, etc. inoperable, causes the memory 310, processor 308, etc. to perform spoof functions, causes the memory 310, processor 308, etc. to perform self-destruct functions, etc. Method 450 ends at block 466.

Figure 18:
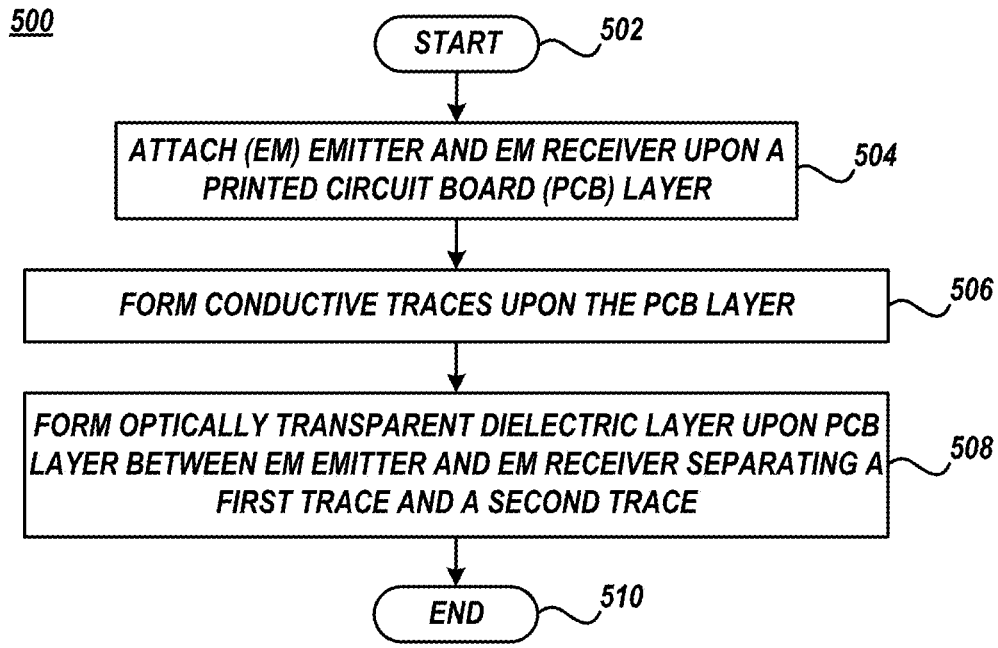
FIG. 18-FIG. 20 illustrate exemplary methods of fabricating a cryptographic adapter card PCB or daughter PCB including an optical security pathway, according to various embodiments of the present invention.

FIG. 18 illustrates an exemplary method 500 of fabricating a PCB including a includes a secure crypto module 106, crypto component 124, optical monitor device 130, and a transparent dielectric layer 200.

Method 500 begins at block 502 and continues with attaching EM emitter 222 and EM receiver 224 to PCB layer (block 504). For example, the EM emitter 222 and EM receiver 224 may be attached to wiring layer(s) 202, etc. Method 500 may continue with forming conductive traces 204 upon the PCB layer (block 506). For example, traces 204 may be positively applied, printed, placed, etc. upon the PCB layer. In some embodiments, where traces 204 are formed by traditional subtractive fabrication techniques, the formation of traces 204 may occur prior to attaching EM emitter 222 and EM receiver 224 to PCB layer.

Method 500 may continue with forming optically transparent dielectric layer 200 upon the PCB layer (block 508). The optically transparent dielectric layer 200 is formed upon the PCB layer at least between EM emitter 222 and EM receiver 224 and at least between adjacent traces 204. Method 500 ends at block 510.

Figure 19:
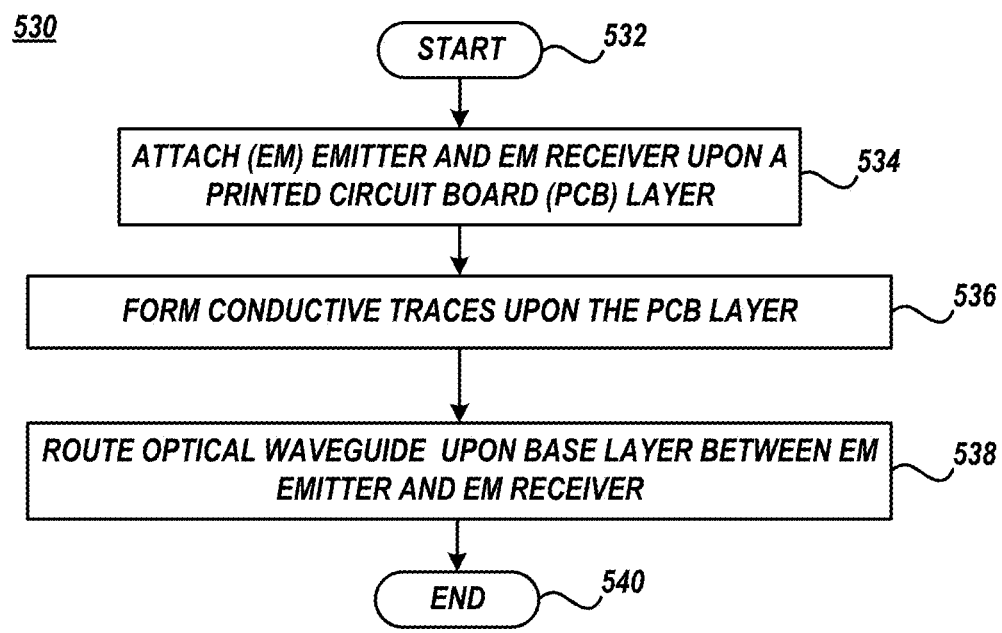

FIG. 19 illustrates an exemplary method 530 of fabricating a PCB including a secure crypto module 106, crypto component 124, optical monitor device 130, and a waveguide 262.

Method 530 begins at block 502 and continues with attaching EM emitter 222 and EM receiver 224 to a PCB layer (block 534). For example, the EM emitter 222 and EM receiver 224 may be attached to wiring layer(s) 202, etc. Method 530 may continue with forming conductive traces 204 upon the PCB layer (block 536). For example, traces 204 may be positively applied, printed, placed, etc. upon the PCB layer. In some embodiments, where traces 204 are formed by traditional subtractive fabrication techniques, the formation of traces 204 may occur prior to attaching EM emitter 222 and EM receiver 224 to PCB layer.

Method 530 may continue with routing waveguide 262 upon the PCB layer (block 538). The waveguide 262 is routed upon the PCB layer and is attached to EM emitter 222 and EM receiver 224. The EM emitted from EM emitter 222 is generally accepted by the waveguide 262 and is detected by EM receiver 224. Method 530 ends at block 540.

Figure 20:
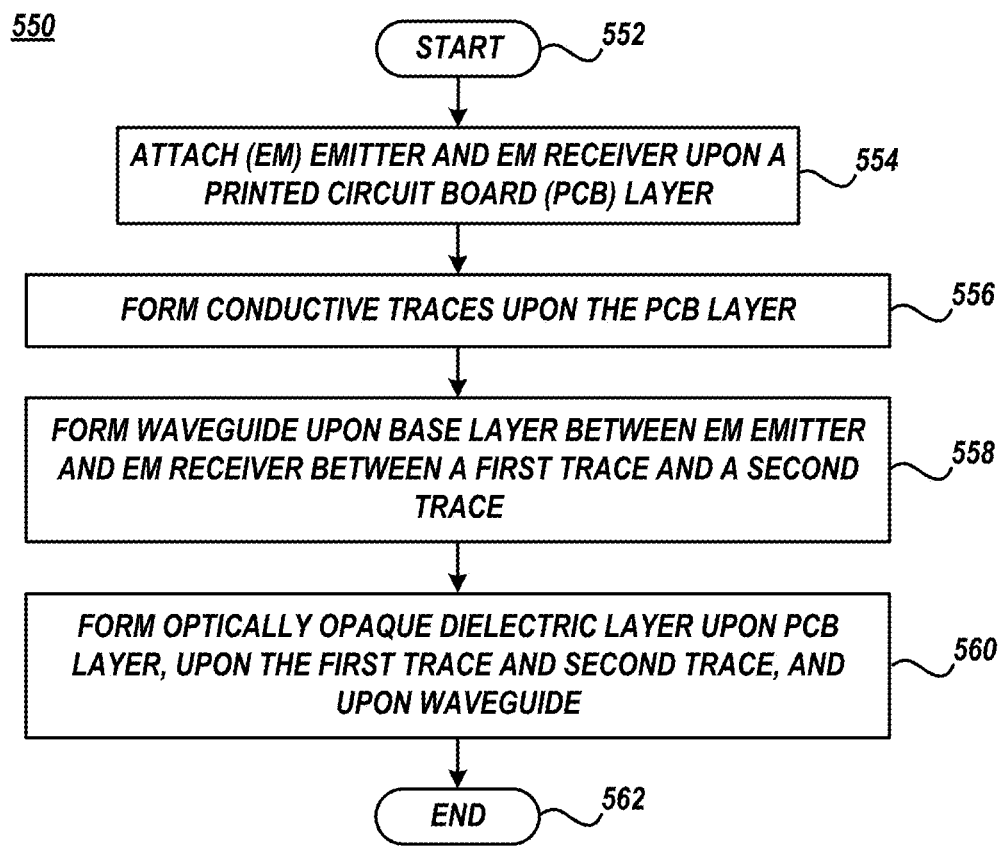

FIG. 20 illustrates an exemplary method 550 of fabricating a PCB including a secure crypto module 106, crypto component 124, optical monitor device 130, and a waveguide 264.

Method 550 begins at block 552 and continues with attaching EM emitter 222 and EM receiver 224 to a PCB layer (block 554). For example, the EM emitter 222 and EM receiver 224 may be attached to wiring layer(s) 202, etc. Method 550 may continue with forming conductive traces 204 upon the PCB layer (block 536). For example, traces 204 may be positively applied, printed, placed, etc. upon the PCB layer. In some embodiments, where traces 204 are formed by traditional subtractive fabrication techniques, the formation of traces 204 may occur prior to attaching EM emitter 222 and EM receiver 224 to PCB layer.

Method 550 may continue with forming waveguide 264 upon the PCB layer between and contacting adjacent traces 204 (block 558). The waveguide 264 is formed upon the PCB layer and contacts EM emitter 222 and EM receiver 224. The EM emitted from EM emitter 222 is generally accepted by the waveguide 264 and is detected by EM receiver 224.

Method 550 may continue with forming encapsulation layer 260 upon the PCB layer, upon the adjacent traces 204, upon the EM emitter 222, upon the EM receiver 224, and upon waveguide 264 (block 560). Method 550 ends at block 562.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A cryptographic adapter card comprising:
a printed circuit board (PCB) comprising a connector that interconnects with a motherboard;
a secure crypto module comprising a daughter card electrically connected to the PCB;

the daughter card comprising: a wiring dielectric layer, a pair of neighboring signal traces upon the wiring dielectric layer, an optical waveguide upon the wiring dielectric layer between and contacting the pair of neighboring signal traces, an optical electromagnetic radiation (EM) emitter upon the wiring dielectric layer optically connected to a first end of the optical waveguide, an optical EM receiver upon the wiring dielectric layer optically connected to a second end of the optical waveguide, and a crypto component;

wherein a destruct feature of the crypto component is programmed in response to the optical EM receiver detecting a predetermined threshold decrease in optical flux of optical EM that is emitted from the optical EM emitter, that is transmitted by the optical waveguide, and that is received at the optical EM receiver.

2. The cryptographic adapter card of claim 1, wherein the pair of neighboring signal traces comprises a first conductive signal trace directly upon the wiring dielectric layer and a second conductive signal trace directly upon the wiring dielectric layer.

3. The cryptographic adapter card of claim 2, wherein a first sidewall of the optical waveguide contacts the first conductive signal trace and a second sidewall of the optical waveguide contacts the second conductive signal trace.

4. The cryptographic adapter card of claim 1, wherein the daughter card further comprises an optical monitor device that generates a tamper signal in response to the optical EM receiver detecting the predetermined threshold decrease in optical flux.

5. The cryptographic adapter card of claim 4, wherein the daughter card further comprises an enable device that upon receipt of the tamper signal from the monitor device programs the destruct feature.

6. The cryptographic adapter card of claim 1, wherein the optical waveguide comprises a core surrounded by a cladding layer.

7. The cryptographic adapter card of claim 1, wherein the daughter card further comprises an optically opaque encapsulation layer upon the transparent dielectric layer.

8. The cryptographic adapter card of claim 1, wherein the optical EM receiver detects the predetermined threshold decrease in optical flux as a result of a void that intersects the optical waveguide.

9. A data handling electronic device comprising:
a motherboard comprising a processor and a memory;
a cryptographic adapter card connected to the motherboard, the cryptographic adapter card comprising:
a printed circuit board (PCB) comprising a connector that interconnects with the motherboard;
a secure crypto module comprising a daughter card electrically connected to the PCB;
the daughter card comprising: a wiring dielectric layer, a pair of neighboring signal traces upon the wiring dielectric layer, an optical waveguide upon the wiring dielectric layer between and contacting the pair of neighboring signal traces, an optical electromagnetic radiation (EM) emitter upon the wiring dielectric layer optically connected to a first end of the optical waveguide, an optical EM receiver upon the wiring dielectric layer optically connected to a second end of the optical waveguide, and a crypto component;

wherein a destruct feature of the crypto component is programmed in response to the optical EM receiver detecting a predetermined threshold decrease in optical flux of optical EM that is emitted from the optical EM emitter, that is transmitted by the optical waveguide, and that is received at the optical EM receiver.

10. The data handling electronic device of claim 9, wherein the pair of neighboring signal traces comprises a first conductive signal trace directly upon the wiring dielectric layer and a second conductive signal trace directly upon the wiring dielectric layer.

11. The data handling electronic device of claim 10, wherein a first sidewall of the optical waveguide contacts the first conductive signal trace and a second sidewall of the optical waveguide contacts the second conductive signal trace.

12. The data handling electronic device of claim 9, wherein the daughter card further comprises an optical monitor device that generates a tamper signal in response to the optical EM receiver detecting the predetermined threshold decrease in optical flux.

13. The data handling electronic device of claim 12, wherein the daughter card further comprises an enable device that upon receipt of the tamper signal from the monitor device programs the destruct feature.

14. The data handling electronic device of claim 9, wherein the optical waveguide comprises a core surrounded by a cladding layer.

15. The data handling electronic device of claim 9, wherein the daughter card further comprises an optically opaque encapsulation layer upon the transparent dielectric layer.

16. The data handling electronic device of claim 9, wherein the optical EM receiver detects the predetermined threshold decrease in optical flux as a result of a void that intersects the optical waveguide.

* * * * *